United States Patent [19]

Holmes et al.

[11] 4,112,372
[45] Sep. 5, 1978

[54] SPREAD SPECTRUM COMMUNICATION SYSTEM

[75] Inventors: Jerry D. Holmes, Dallas; Charles R. Johnson, Garland; Allen S. Jones, Dallas; Charles R. Hewes, Richardson, all of Tex.

[73] Assignee: Texas Instruments Incorporated, Dallas, Tex.

[21] Appl. No.: 758,520

[22] Filed: Jan. 11, 1977

[51] Int. Cl.$^2$ .............................................. H04L 1/00
[52] U.S. Cl. ...................................... 325/321; 325/42
[58] Field of Search ....................... 325/41, 42, 65, 43, 325/323, 473; 307/221 D, 293; 328/167; 235/152, 193, 156; 333/70 T

[56] References Cited

U.S. PATENT DOCUMENTS

| 4,017,798 | 4/1977 | Gordy et al. | 325/42 |
| 4,034,199 | 7/1977 | Lampe et al. | 235/193 |
| 4,041,391 | 8/1977 | Deerkoski | 325/473 |

*Primary Examiner*—Benedict V. Safourek
*Attorney, Agent, or Firm*—Rene' E. Grossman; Alva H. Bandy

[57] ABSTRACT

An improved spread spectrum communication system having a transmitter subsystem and a receiver subsystem is disclosed. The transmitter subsystem comprises a data source of 50 bps rate which is modulo-2 added to a C/A (clear/acquisition) code of 1,023K chips/sec in an EXCLUSIVE OR gate, phase modulated on a carrier signal at about 154 $f_o$ where $f_o$ = 10.23 MHz in a phase shift keying modulator and transmitted. The receiver subsystem comprises an antenna for receiving the phase modulated signal, a plurality of filter/amplifier mixer stages for reducing the phase modulated signal to baseband, an in-phase CCD matched filter channel and a quadrature phase CCD matched filter channel for determining the presence of the C/A code and the phase of the incoming C/A code for synchronizing a replica of the C/A code with the incoming C/A code, a mixer for beating the replica C/A code signal with the C/A code signal, a Costas loop for automatic phase control, a sampler for sampling the baseband signal, an integrator for integrating the sampled signals, and a clocked comparator for comparing the integrated signals with a zero voltage at a 50Hz rate to demodulate the data code. Two embodiments of the CCD matched filter are disclosed. The first comprises a CCD having a length equal to five times the number of stages for each period of the C/A code. The second comprises a CCD transversal filter having a feedback loop for use in its transversal filter mode and in a recursive filter mode to enhance C/A code signals relative to noise.

11 Claims, 7 Drawing Figures

SPREAD SPECTRUM COMMUNICATION SYSTEM

This invention relates to electromagnetic communication devices and more particularly to a spread spectrum communication system.

In the past, spread spectrum communication systems have utilized a transmitter to transmit a coded transmitter identification signal to a receiver adapted to search incoming signals for the transmitter identification code. These systems have utilized a "serial search" to acquire the C/A (clear/acquisition) code identifying the particular transmitter pulse being received. The "serial search" technique involves searching the potential code phase cells one-by-one in a serial manner to determine the C/A code phase in the incoming signal. The problem with the prior art systems is the length of time required for code acquisition. This problem is inherent in the existing receiver subsystems as the entire receiver is devoted to the investigation of one phase cell (chip). That is, while one phase cell is being investigated, nothing is being learned about the other phase cells of the code, and these remaining code cells might contain the code phase being sought. The average time spent in rejecting a false decode phase, using the serial search can typically be about 7 milliseconds for some applications which provides a search rate of about 140 chips per second. This rate is too slow for many present day applications. For example, in a global positioning system the phase code cells number 1,023 and acquisition is to be obtained in 5 milliseconds. At the above mentioned serial search rate, about 7 seconds would be required to investigate the 1,023 bit code.

Accordingly, it is an object of this invention to provide an improved spread spectrum communication system.

Another object of the invention is to provide a spread spectrum communication system utilizing a parallel or "pipe line" technique to obtain C/A code phase acquisition.

A further object of the invention is to provide a spread spectrum communication system utilizing a matched filter in its transversal and recursive mode to obtain C/A code phase acquisition.

Still another object of the invention is to provide a spread spectrum communication receiver with a C/A code phase detector for transmitter acquisition and for demodulating data obtained from the transmitter carrier to provide as a navigational aid information for measuring pseudorange and pseudorange rate.

A further object of the invention is to provide a C/A code receiver with a fast C/A code phase acquisition rate which is both economical and easy to fabricate.

Briefly stated, the invention comprises a spread spectrum communication system having a radio transmitter and receiver. The transmitter includes a data source whose rate is measured in bits per second and a protected (P) code or a clear/acquisition (C/A) code or both measured in chips per second. The codes are a series of ones and zeros which are modulo 2 added in an EXCLUSIVE OR gate; i.e., the codes are a series of binary ones and zeros which will combine in accordance with the truth table of TABLE I.

TABLE I

| EXCLUSIVE OR GATE OUTPUT |
|---|
| A = DATA |

TABLE I-continued

EXCLUSIVE OR GATE OUTPUT

|   | 0 | 1 |
|---|---|---|
| 0 | 0 |   |
| 1 |   | 0 |

B = P OR C/A

When A and B both are either zeros or ones, C is false, and when A is a one and B is a zero or vice versa, C is true. These added code signals are applied to a phase shift keying modulator for phase modulation and transmission to the receiver subsystem. The P code producing structure is the same as the structure producing the C/A code and therefore will not be described. The P code has a clock frequency which is an integer multiple of the C/A code and both have a carrier frequency of some integer multiple thereof.

The receiver includes an antenna to receive the continuously transmitted signals which are reduced to baseband in a plurality of IF mixer stages. The difference signals are applied to a matched filter of the charge transfer type, hereinafter described in greater detail, for spread spectral analysis of the data rate and C/A code frequencies. The matched filter determines the presence of the transmitted C/A code and its code phase for use in different receiver embodiments, hereinafter described. The detected data code signals are sampled in a sampler, integrated in an integrator and compared with a zero voltage in a comparator clocked at the data code rate. The resulting signal is the demodulated data. The data is then processed in a microprocessor for obtaining information, such as, for example, pseudorange to the satellite transmitter for accurately determining the position of a vehicle.

The invention itself, as well as other objects and advantages thereof may best be understood by reference to the following detailed description of illustrative embodiments when read in conjunction with the accompanying drawings in which.

Figure 1:
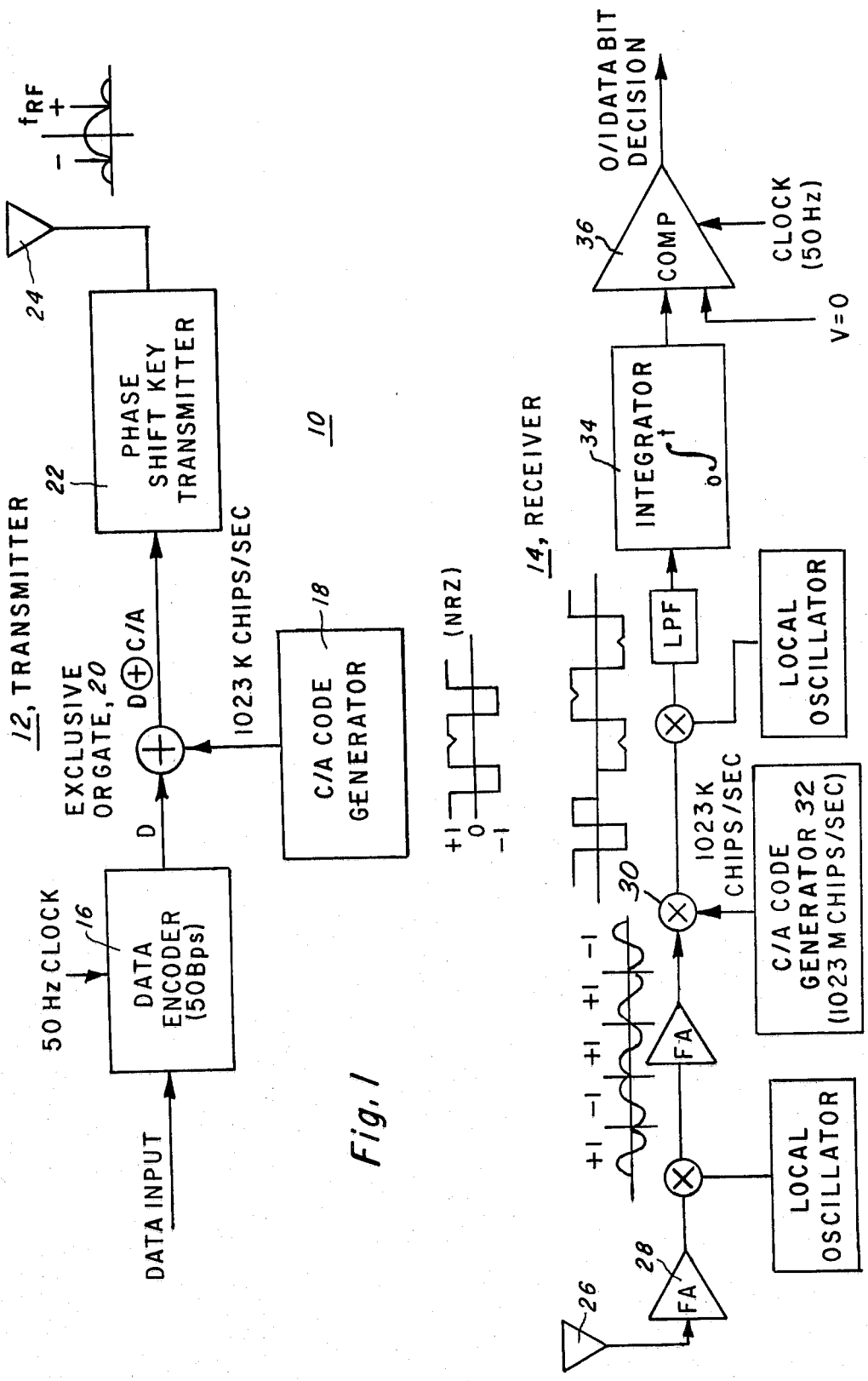
FIG. 1 is a block diagram of a spread spectrum communication system.

Referring to FIG. 1 in which the spread spectrum communication system 10 of the present invention is disclosed, the system 10 comprises the transmitter subsystem 12 and a receiver subsystem 14. The transmitter subsystem is basic to that carried, for example, in a plurality of navigational satellites utilized in a global positioning system. The transmitter may be any one of several types; however, for purposes of description only, a direct sequence transmitter will be used. In such a transmitter the incoming information, if not already digitized, is digitized at a desired data rate code (D) in an analog to digital (A/D) converter 16. The preferred data rate is, for example, 50 bits per second (bps). The data stream is modulo-2 added to either a P (protected) code or a C/A (clear/acquisition) code or both. In a global positioning system the P code repeats only about once a week and is used for fine tracking of the transmitter carrier, and the C/A code is used continuously to identify the carrier. Thus, as the structure of the invention for the P code is identical to that of the C/A code, the structure will be described using the C/A code in the example. The P code has a frequency, for example, of 10.23 megachips per second a length of $\approx 6 \times 10^{12}$ chips, and is periodic. The C/A code has a frequency of 1.023 megachips per second, a length of 1023 chips and a period of 1 millisecond. The C/A code is generated in a shift register code generator 18, and is modulo-2 added to the data stream in EXCLUSIVE OR gate 20.

Many possible waveforms can be used to spread the spectrum of a digital signal. For the purpose of description only, the RF carrier is modulated with the data stream ⊕ and the C/A code stream by phase shift keying the carrier in a phase shift key transmitter 22. The carrier frequency may be for the P code 154 $f_o$ (10.23 MHz) and the same for the C/A code. The transmitted waveform, transmitted by antenna 24 is for either situation the signal spectrum shown in FIG. 1, where the main lobe bandwidth of the signal is equal to twice the clock rate of the code and each side lobe is equal to the code clock rate width. The signal envelope is sin $x/x$. More specifically, this transmitted waveform consists of a series of equal-length segments of carrier signals which differ only in phase. If the phase is 0° or 180°, the waveform is bi-phase psk. For purpose of description, this waveform will be used. The psk signal has a duration $T_B$ and is made up of $N_c$ equal-length chips which may have any prescribed phase as to a reference carrier (0° – 180° for bi-phase). The phases are assigned according to some code sequence but define a particular symbol. A collection of such codes can define an alphabet of symbols, in which case successful communication of a symbol results in the transmission of serial bits of information. The signal waveform or its compliment is used to transmit data at some bit rate:

$f_b = 1/T_B$ on a carrier $f_o$ is $V \pm (t) = 2 \cos[2\pi f_o t + \alpha_i(t)]$ where $\alpha_i(t) = \pm \pi/2$ for each chip, depending on the code sequence being used. The bandwidth is determined by the duration of the chip $T_B/N_c$ rather than the symbol duration. Thus, the bandwidth has been increased by a factor of $N_c$ resulting in a spread spectrum signal. The C/A code generated by the sawtooth generator 18 is a series of plus one and minus one pulses modulo-2 added in EXCLUSIVE OR gate 20; that is, C is true if A is true and B is false or if A is false and B is true. The purpose of this coding technique will become apparent as the description proceeds.

The transmitted RF signal of the transmitter subsystem 12 is received by the receiver subsystem 14. As the example includes a direct sequence transmitter, a direct sequence receiver 14 is used. The direct sequence receiver operates by receiving the RF spread spectrum signal in antenna 26. The signals are filtered and amplified in one or more filter amplifier stages 28 and multiplied in multiplier 30 with a shift register code generator module 32 generated replica of the P or C/A code being considered. As the replica code has plus one and minus one values which correspond to the transmitted C/A code signals the result is a remapping or collapsing of the wideband signal into a bandwidth which is substantially that of the data alone. This collapsing of the signal bandwidth substantially attenuates jamming noise appearing in the data rate bandwidth. The resulting data signals are integrated in an integrator 34 and the integrated signals are compared with a zero voltage in a clock comparator 36 to determined the polarity of the integrated signals. The polarity determines whether the integrated signals are logic ones or zeros. With the clock comparator clocked at the data code rate of 50 Hz the receiver output is a digitized replica of the data stream for processing in a microprocessor to obtain such information as satellite locations.

Figures 2, 3:
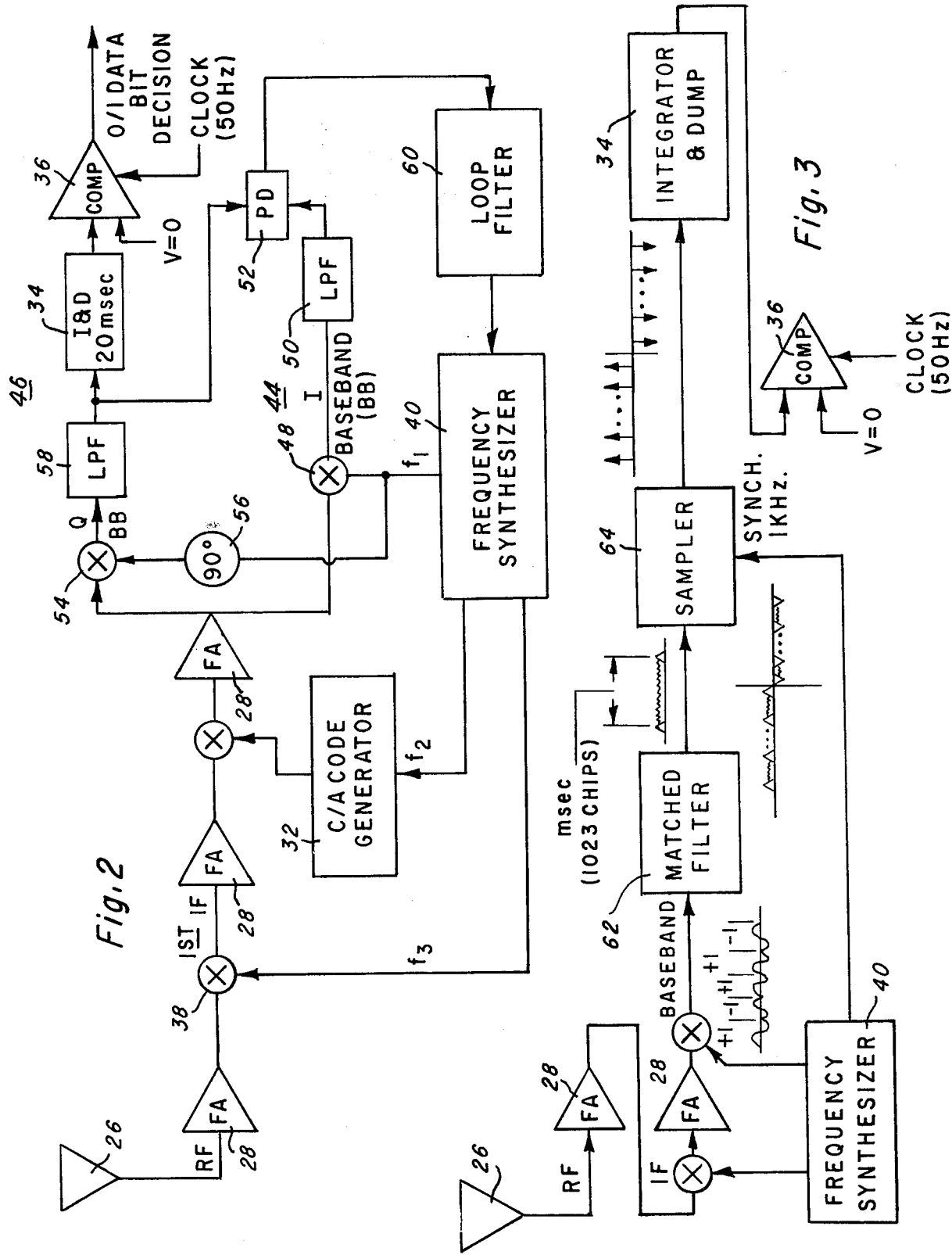
FIG. 2 is a block diagram of another embodiment of the receiver of the spread spectrum communication system of FIG. 1.
FIG. 3 is a block diagram showing the incorporation of a matched filter in the spread spectrum communication system receiver of FIG. 1.

The system of FIG. 1 is accurate only when the incoming signals are corrected for frequency drift and the C/A code generated by the receiver's shift register code generator is in phase with that of the transmitter's shift register code generator. An embodiment of the invention for adjusting the received signals for frequency shift is shown in FIG. 2, and an embodiment of the invention for obtaining the desired P or C/A code phase relationship is shown in FIG. 3. In these FIGS. 2 and 3, as in all the other figures, like numerals are used to designate like parts.

The embodiment of FIG. 2 includes an antenna 26 for receiving the modulated RF signal transmitted by the transmitter 12. The received RF signal is reduced to baseband through a first RF stage comprising a filter amplifier 28 and a mixer 28 having as its local oscillator a suitable frequency output of, for example, a frequency synthesizer 40. If necessary to reduce the modulated RF signal to baseband one or more such stages are used. The baseband signal is reduced to the data code frequency by multiplying the baseband signal comprising the data ⊕ C/A code with a replica of the C/A code generated by P and C/A code generator module 32. The output signal is bandpass filtered by filter/amplifier 28 and applied to channels 44 and 46. Channel 44 includes a multiplier 48 multiplying the data signal with a frequency of one phase (zero°) obtained from frequency synthesizer 40. The output of multiplier 48 is passed through a low-pass filter 50 and the filtered output applied as one input to phase detector 52. Similarly the channel 46 includes a mixer 54 for mixing the data with the frequency signal applied to mixer 54 shifted 90° in phase by phase shifter 56. The quadrature output signal of mixer 54 is passed through low-pass filter 58 and connected to an integrate and dump circuit 34 and to phase detector 52 as its second input. The difference output of the phase detector is a measure of any frequency and/or phase drift. The output of phase detector 52 is connected to low-pass loop filter 60 where it is filtered and applied to the frequency synthesizer 40. Control voltage on the frequency synthesizer changes the frequencies in a direction that reduces the phase difference between the input signal and the frequencies of the frequency synthesizer. The integrate and dump circuit 34 sums the output of the quadrature channel for a prescribed period determined by the data frequency (1/50 = 20 milliseconds) and the integrator output is compared against a zero voltage in clocked comparator 36 which is clocked at the 50Hz rate to reproduce the transmitted data stream.

The receiver embodiment of FIG. 3 includes a matched filter 62 for obtaining the desired C/A code phase relationship. The matched filter 62 is, for example, a charge transfer device such as a bucket brigade device (BBD) or a charge coupled device (CCD), weighted to form a transversal filter. The construction of suitable charge transfer devices such as the bucket brigade and the CCD transversal filter are shown in U.S. Pat. No. 3,935,439 issued Jan. 27, 1976. For purposes of description a weighted charge coupled device (CCD) will be used. Those skilled in the art desiring a more detailed description of the construction of the weighted BBD or CCD (transversal filter) are referred to the above-mentioned patent. The following description will be sufficient for those skilled in the art to practice the present invention. The length of the CCD depends in part upon the length of the C/A code. For a C/A code having a 1 millisecond period and 1023 phase cells or chips the search rate is $1.023 \times 10^6$ chips per second. Thus when the CCD matched filter is loaded each new cell is searched at the clock rate which is 1.023 megacycles per second. This is similar to a "pipe line" digital processor. As shown in FIG. 3, when a coded chip stream is applied to the matched filter 62, it is filtered and its correlation is reproduced at its output. When the matched filter code coefficients are in phase with the incoming C/A code the output signal reflects this fact and the amplitude of the matched filter output is increased. This will occur once in every millisecond during which 1,023 chips have been searched. The spikes of the matched filter output signal shown in FIG. 3 indicate the enhanced signals when the codes are in phase. The matched filter output signals are sampled in sampler 64 at 1 millisecond intervals and integrated for 20 milliseconds in integrator 34. The integrated samples are compared in clocked comparator 36 with a zero voltage to determine their polarity to reproduce the transmitted data rate code.

Figure 4:
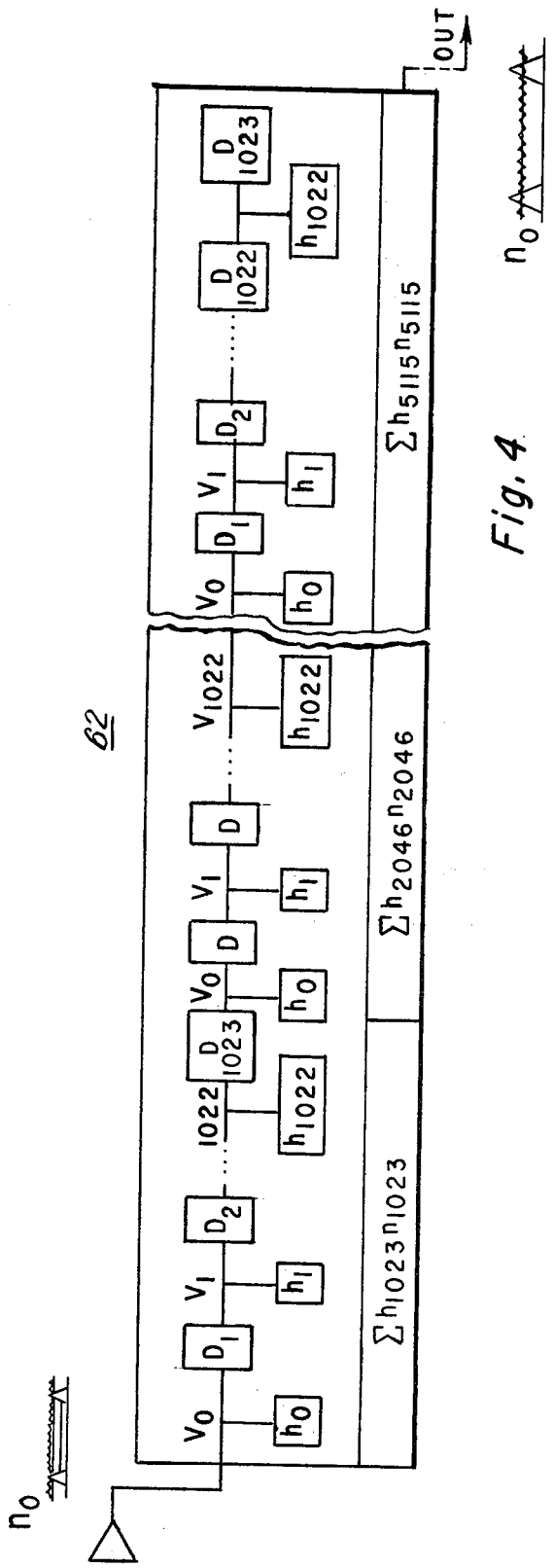
FIG. 4 is a block diagram of one embodiment of the matched filter of the spread spectrum communication receiver of FIG. 3.
Figure 5:
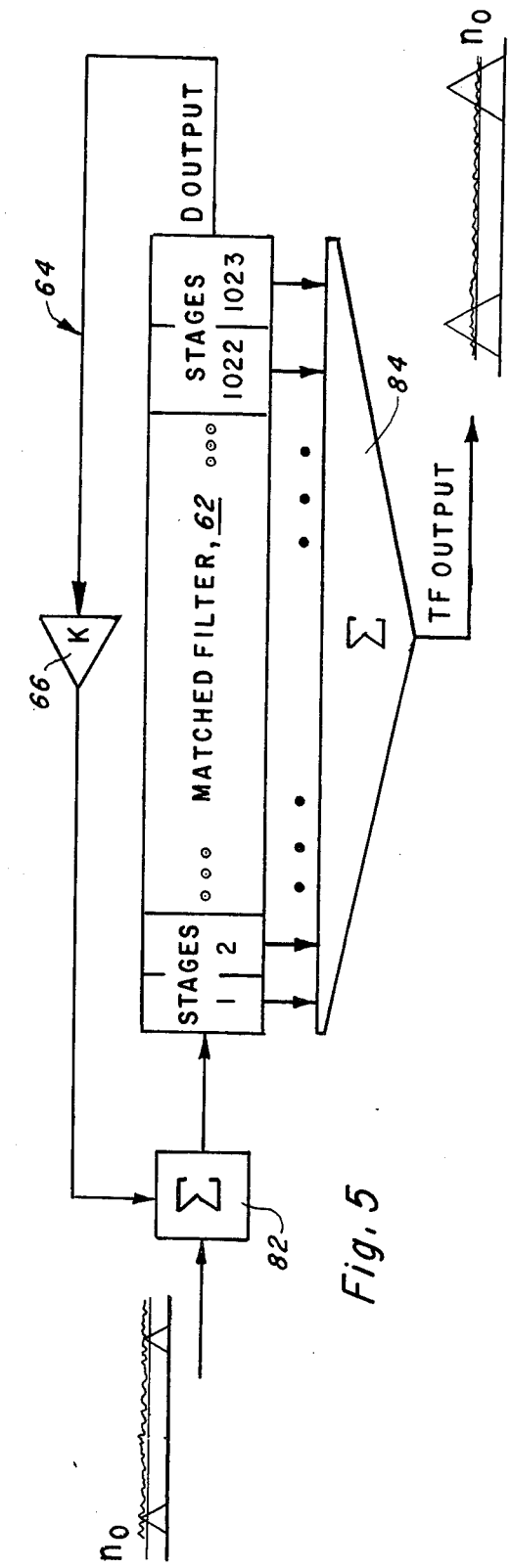
FIG. 5 is a block diagram of another embodiment of the matched filter for the spread spectrum communication receiver of FIG. 3.

The above described embodiment is suitable for use only in a substantially noise free embodiment. Where noise is present, its amplitude has been found to be substantially that of the matched filter's C/A code in phase indicating (resonant) signal. Thus, to detect the matched filter C/A code resonant signal it is necessary to build its amplitude above that of the noise level. FIGS. 4 and 5 show CCD matched filter structures for enhancing the C/A code resonant signal. Referring to FIG. 4, this transversal CCD 62 embodiment comprises increasing the length of the matched filter to accommodate more than 1 period (1 millisecond) of the C/A code. Using this embodiment, it has been found that 5 periods (5 milliseconds) of the C/A code sequence is adequate. The amplitude of the resonant spike is enhanced with each period until its amplitude is raised above that of the noise, which being predominately random noise will decrease in amplitude with each period. Consequently, the length of the matched filter is made equal to the chip rate multiplied by the integration time. In the example used, the length is equal to 1.023 Mcps $\times$ 5 milliseconds or 5,115 stages. As this number of stages exceeds the present state of the art for CCD's either the length of the code or its number of periods must be decreased or the embodiment of FIG. 5 used.

Referring to FIG. 5 for a second embodiment of the matched filter 62 in which the CCD performs two functions. The first function is that of a transversal filter and the second function is that of a recursive filter. To make the CCD act as a recursive filter, the number of CCD stages must provide a delay time equal to the C/A code period and a feedback circuit 64 or recursive loop is provided. The feedback circuit 64 includes a gain amplifier 66 and has one end connected to the delay output of the CCD and its other end connected to summation amplifier 82. Gain K of the amplifier 66 sets the number of times of feedback required for signal detection. Output of the amplifier 66 of the feedback circuit 64 is connected to the summing circuit 82 for adding the feedback signals in phase with the received C/A code signals which are weighted in the matched filter 62. After a few cycles, voltage of the matched filter is enhanced to a voltage detectable above that of the noise amplitude.

The above described systems including their matched filter embodiments do not take into consideration phase shift resulting from the transmission time and doppler effect resulting if the transmitter is carried by a moving vehicle.

Figure 6:
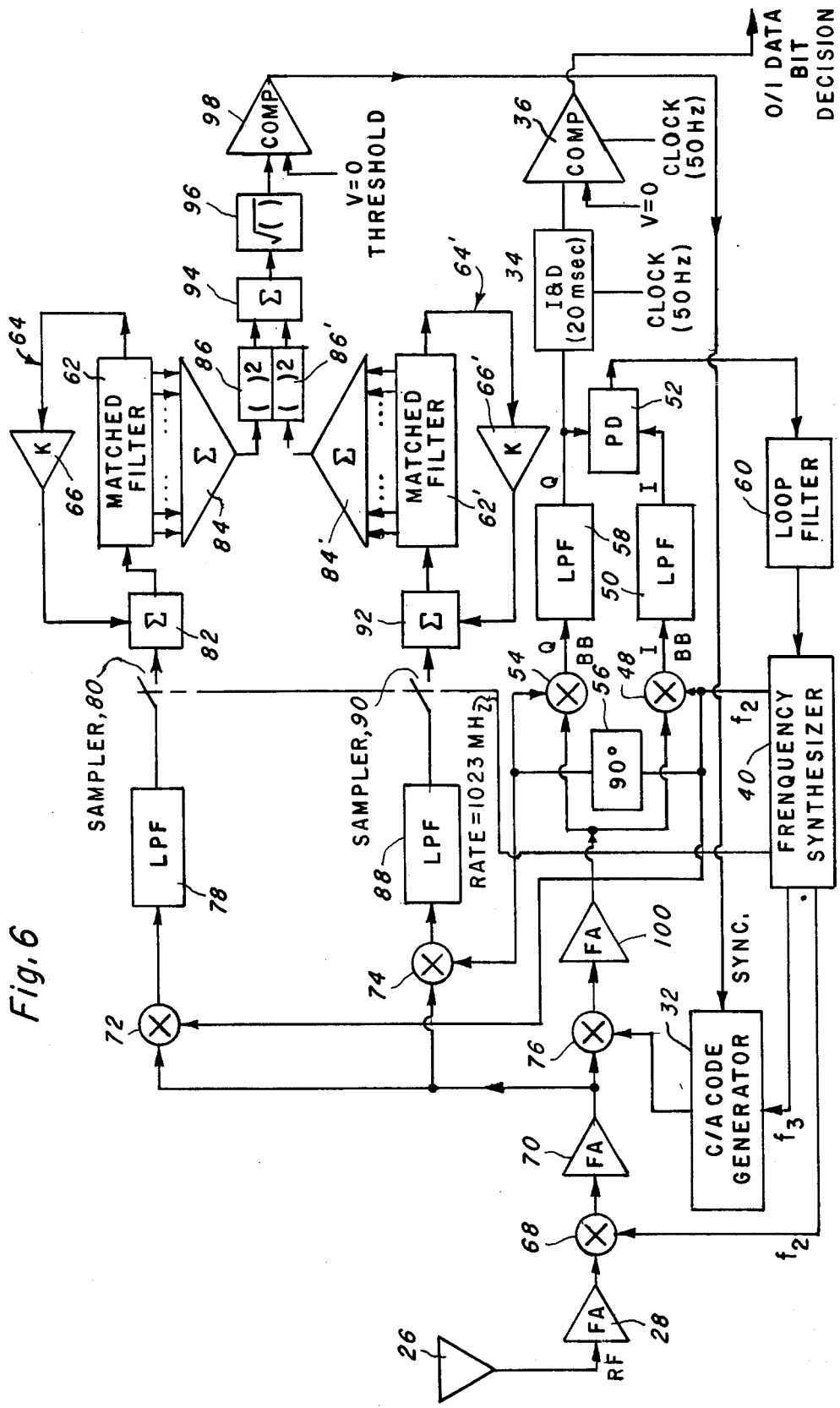
FIG. 6 is a block diagram of a second embodiment of the spread spectrum communication receiver of FIG. 3.

FIG. 6 shows the receiver subsystem with the second matched filter embodiment (FIG. 5) included to identify the C/A code and to determine the C/A code phase, and with the phase detector circuit (FIG. 2) included to provide frequency drift control. In FIG. 6 the signals received by antenna 26 are down-converted through an IF stage comprising a filter amplifier 28 connected to an input terminal of mixer 68. A frequency synthesizer 40 provides a frequency $(f_1)$ to the other input terminal of mixer 68. The difference signal of mixer 68 is applied to filter amplifier 70. The output of filter amplifier 70 is at first IF and includes the data rate code and C/A code. The IF signal of filter amplifier 70 is connected to input terminals of mixers 72, 74 and 76. Mixer 72 has its other input connected to frequency $(f_2)$ of frequency synthesizer 40 and its output connected to low-pass filter 78 to remove noise and the frequency $(f_2)$. The output of the low-pass filter 78 is connected to a sampler 80 and the sampled signals applied to adder 82 of the matched filter 62. The sampler 80 is connected to frequency synthesizer 40 for clocking at a rate of 1.023 MHz for the 1023 stages of the matched filter 62. The matched filter 62 is a weighted transversal filter with a recursive or feedback loop 64. The filter has a plurality of stages corresponding in number and value to the received C/A code. Thus for our example the filter has 1023 stages which are filled with the signals of adder 82. The values of the filter's outputs are summed in adder 84 and the sum squared in squarer chip 86.

Similarly the mixer 74 has its other input coupled in quadrature to the frequency $(f_2)$ of frequency synthesizer 40 through a 90° phase shifter 56. The output of mixer 74 is filtered in low-pass filter 88 and the filtered signal sampled in sampler 90. The sample 90 is also coupled to the frequency synthesizer 40 for sampling at the 1.023 MHz rate. The sampled signals are added in adder 92 and applied to matched filter 62'. The matched filter 62' corresponds to matched filter 62 and therefore need not be described again. Its summed output is squared in squarer chip 86'. The squared values of squarer chips 86 and 86' are added in adder 94 and the square root taken in chip 96. Squarers 86 and 86', adder 94 and square root chip 96 are Analog Devices Corporation chip AD532M. The output of chip 96 is compared in comparator 98 to a threshold voltage. The threshold voltage is set at a preselected value which is above the value of expected noise. With the stages of the matched filters 62 and 62' filled, each additional sample is summed with a corresponding amplified sample from the matched filters 62 and 62'. The corresponding amplified signals are those exiting the matched filters and passing through the recursive loops 64 and 64' where they are amplified by amplifiers 66 and 66' before being added to the next incoming period signals. When the incoming C/A code is in phase with the corresponding C/A code of the matched filter the output signal peaks in amplitude. The recursive or feedback loop of FIG. 6 has considerably greater signal-to-noise ratio (SNR) than the periodic CCD transversal filter of FIG. 4 depending on the recursive filter gain K. The recursive loops 64 and 64' act as low-pass filters. The nearer the gain is to unity, the lower the corner frequency is and if the local oscillator frequency is tuned to the signal frequency within the matched filter bandwidth, the better the SNR of the output. Until tuned, the signal magnitude of the correlation envelope is attenuated in accordance with the following equation:

$$\text{factor} = \sin(\pi f_d T_{int})/\pi f_d T_{int}$$

where $f_d$ = doppler frequency error between local oscillator and incoming signal frequency, $T_{int}$ = total integration time of transversal/recursive filter $\simeq \frac{1}{2}\pi f_{3dB}$; and $f_{3dB}$ = 3dB corner frequency of recursive low-pass filter.

Thus, as the gain factor K gets closer to unity the SNR improves if the signal frequency stays within the diminishing bandwidth, and the bandwidth of the recursive low-pass filter shrinks. Accordingly, the number of doppler cells which must be searched increases proportionally for a given frequency uncertainty. With the recursive filter gain set at a value resulting in an SNR of plus 10db (for a carrier/noise of plus 28db Hz) the effective integration time ($T_i$) is about 16 milliseconds figured as follows:

$$SNR = CT_i/n_o = 28db + 10 \log_{10} T_i = +10db$$

$$10 \log_{10} T_i = 10 - 28 = -18db\text{-sec.}$$

which is equal to minus 18db second, yielding $T_i$ approximately = 16 milliseconds.

Accordingly, the recursive filter must integrate over 16 pulses (16 milliseconds) which is possible with a recursive gain factor K appropriately = 0.94. With the integration of 16 pulses, the 3 db bandwidth of the recursive low-pass filters become about 10Hz single sided; so, the doppler cell being searched is only ± 10Hz = 20Hz. At the low-pass filter bandwidth of 10Hz about 100 to 200 milliseconds of time is required for the filter transient response to disappear. At this point an additional 1 millisecond is required to examine all 1023 C/A code phase cells. Thus, in the worst case situation, the search rate is approximately equal to 5,090 chips per second figured as follows:

rate = 1023 chips/201 milliseconds approximately equal 5,090 per second.

In this manner the amplitude of the resonant signal is raised above the threshold voltage of comparator 98 and the resulting signals are applied to the code generator 32 as C/A code synchronizing signals.

The C/A code generator utilizes a frequency signal ($f_3$) from the frequency synthesizer 40 to provide a synchronized C/A code signal which is a replica of the incoming C/A code signal to mixer 76. The output of mixer 76 which is the data signal and noise is passed through filter amplifier 100 to mixers 54 and 48 where it is beat with the frequency signal ($f_2$) of the frequency synthesizer applied in phase to mixer 48 and in quadrature to mixer 54 through the phase shifter 56. The outputs of the mixers 48 and 54 are baseband signals representative of the NRZ (nonreturn to zero) data and are passed through low-pass filters 50 and 58 to phase detector 52. The output of the low-pass filter 58 is also applied to an integrate and dump circuit 34. The phase detector signal of the phase detector which forms a part of a Costas loop is passed through the loop filter for providing a signal of desired parameters to the frequency synthesizer 40 to adjust the synthesizer for any frequency and/or phase drift of the incoming signal. The frequency synthesizer acts as the voltage controlled oscillator.

Finally, the integrate and dump circuit 34 integrates the data rate code output of the low-pass filter 58 at a preselected interval which for 50 bit per second data is 20 milliseconds and dumps the output to a clock comparator 36 to sample again. The clocked comparator is clocked at a 50Hz rate and each signal compared with zero volts to determine the polarity of the compared signal for making a 0/1 data bit decision and reconstructing the transmitted data bit stream.

Figure 7:
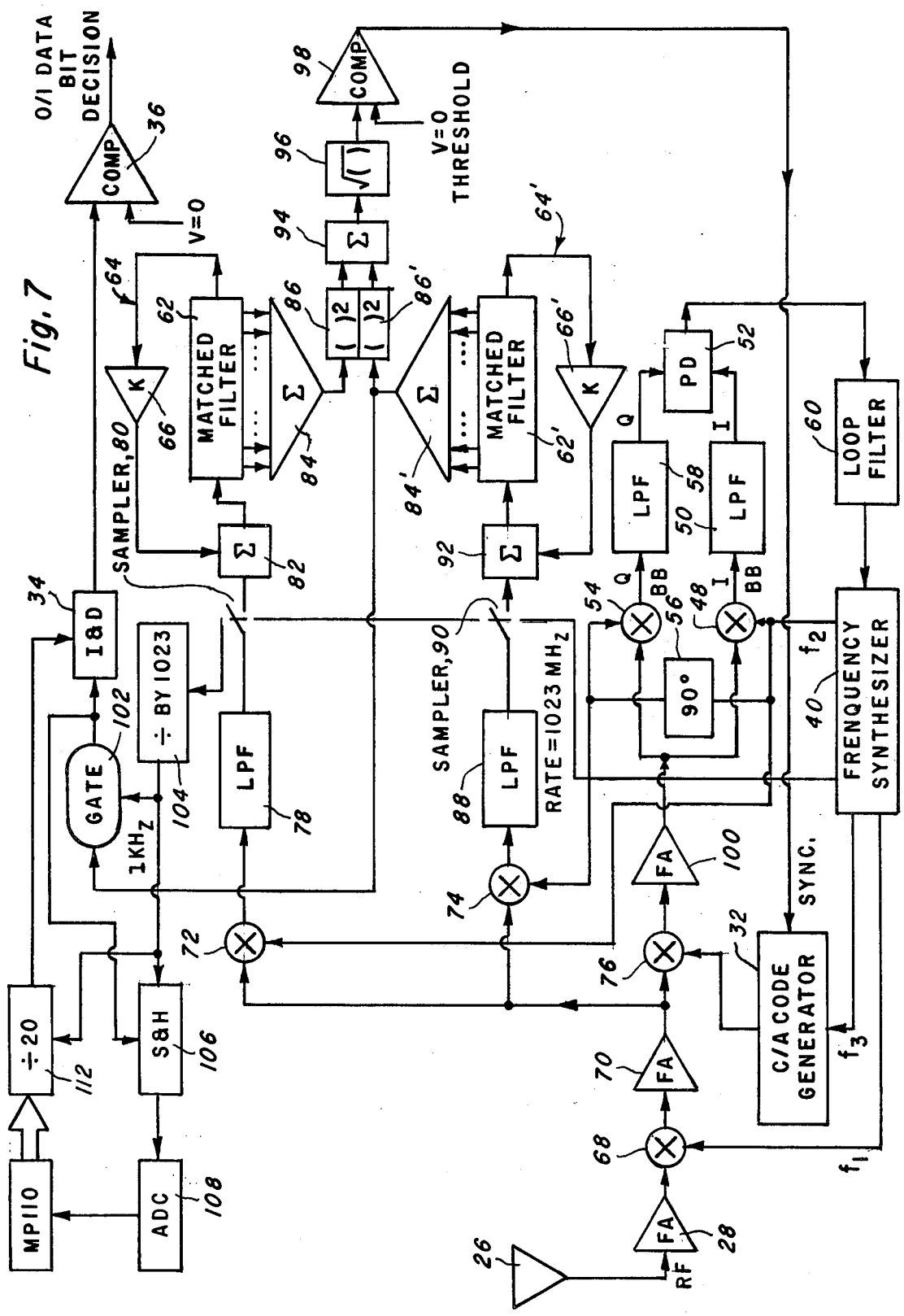
FIG. 7 is a block diagram of a third embodiment of the spread spectrum communication receiver of FIG. 3.

Referring to FIG. 7 for another embodiment of the spread spectrum receiver of FIG. 6 in which the output location is moved from the junction of the low-pass filter 58 and the phase detector 52 to the output of the matched filter 62'. This output change is made as follows. The output of the matched filter 62' is applied to an input of gate 102. The gate is clocked at the C/A code rate of one millisecond by applying the 1.023 MHz signal of the frequency synthesizer 40 to a divide by 1023 circuit 104. The output of gate 102 is integrated and dumped at 20 milliseconds intervals in an integrate and dump circuit (I&D) 34 clocked at the C/A code data rate of 50 Hz. The dump signal is obtained by connecting a sample and hold circuit 106 to the 1KHz output of gate 102 of which one out of 20 output signals represents the data bit synchronization or dump pulse. The sample and hold circuit 106 is controlled by the 1KHz output of the divide by 1023 divider and the output of the sample and hold circuit is digitized each millisecond in an analog to digital converter 108. The digitized output is connected to a microprocessor 110 programmed to determine the data bit synchronization pulse and its location (phase) from the first count and provide a phase correction signal to the control input of a divide by 20 divider 112. The divide by 20 divider is also connected to the 1KHz output of divider 104. The divide by 20 divider output, corrected in phase is connected to the integrate and dump circuit 34 as the dump signal. The output signals of the I&D circuit is applied to comparator 36 where they are compared with a zero voltage to determine their polarity for a 0/1 data bit decision and reproduction of the data bit stream.

One skilled in the art will recognize that the structures of the components of the invention embodiments are well known components and therefore they have not been described in detail. A detailed description of the components would cloud the disclosure of the present invention.

Although several embodiments of this invention have been described herein, it will be apparent to a person skilled in the art that various modifications to the details of construction shown and described may be made without departing from the scope of this invention.

What is claimed is:

1. A spread spectrum RF energy receiver comprising:
   (a) an RF energy receiving means for receiving an RF signal modulated with a first and second code;
   (b) a first mixer means connected to the RF energy receiving means and local oscillator frequency generating means for converting the received RF energy signal to baseband;
   (c) a code acquisition and synchronizing circuit connected to the first mixer means, the code acquisition and synchronizing circuit including a charge transfer device matched filter for determining the presence of a preselected second code in the received RF energy signal and producing a synchronization pulse;
   (d) a frequency generating means for producing responsively to the synchronization pulse of the code acquisition and synchronizing circuit a replica of the preselected second code;
   (e) a second mixer means connected to the frequency generating means and first mixer means for converting the baseband signal to the first code signal;
   (f) a frequency drift compensating circuit connected to the second mixer for producing a phase difference signal applied to the frequency generating means for automatic frequency and/or phase control; and
   (g) means operatively connected to the receiver for converting the first code signal to a binary code.

2. A spread spectrum RF energy receiver according to claim 1 wherein the means for converting the first code signal to a binary code is connected to the frequency and/or phase drift compensating circuit.

3. A spread spectrum RF energy receiver according to claim 1 wherein the means for converting the first code signal to a binary code is connected to the output of a charge transfer device matched filter of the code acquisition and synchronizing circuit.

4. A spread spectrum RF energy receiver according to claim 1 wherein the charge transfer device matched filter is a charge coupled device matched filter.

5. A spread spectrum RF energy receiver according to claim 1 wherein the charge transfer device matched filter is a bucket brigade device matched filter.

6. A spread spectrum RF energy receiver according to claim 1 wherein the charge transfer device matched filter is a charge coupled device having a preselected number of portions of stages, each portion having a plurality of stages corresponding in number to the number of chips in the second code.

7. A spread spectrum RF energy receiver according to claim 1 wherein the charge transfer device matched filter is a charge coupled device having a plurality of stages corresponding in number to the number of chips of the second code and having a time delay equal to the period of the second code, and a recursive filter loop for feeding back amplified signals to corresponding input signals for amplification of the charge coupled device matched filter output.

8. A spread spectrum RF energy receiver according to claim 1 wherein the code acquisition and synchronizing circuit comprises first and second circuits connected in parallel, said first and second circuits each including mixers coupled, respectively, to the output terminal of the first mixer means for producing the baseband signals, a frequency generating means, said frequency generating means connected, respectively, in phase and in quadrature to the mixers, low-pass filters connected, respectively, to the mixers outputs for filtering noise from the baseband signals, samplers coupled, respectively, to the low-pass filters, a frequency generating means coupled, respectively, to the samplers, the frequency generating means providing a frequency for operating the samplers at the period rate of the second code signal, adders coupled, respectively, to the samplers, CCD matched filters having first outputs coupled to recursive filters, said adders coupled to the recursive filters outputs for adding the sampled outputs with the recursive filter outputs, the CCD matched filters, respectively, having adders for summing the outputs of the CCD matched filters stages, squarers connected, respectively, to the CCD matched filters adders for squaring the CCD matched filters adders outputs, and an adder connected to the squarer outputs of the first and second circuits for summing the squared outputs, a square root circuit connected to the first and second parallel circuit outputs adder for producing a resultant envelope signal of the second code, and a comparator connected to the square root circuit for comparing the amplitude of the resultant signal with a threshold signal for determining the presence of the second code and producing the synchronizing pulse.

9. A spread spectrum RF energy receiver according to claim 8 further including a gate having a first input connected to the output of the adder for summing the outputs of the stages of the CCD matched filter of the second circuit, and a second input, a frequency generating means coupled to the second input of the gate for gating out the CCD matched filter output at its period rate, a clocked integrate and dump circuit for adding the data outputs at the first code rate and a comparator for comparing the clocked integrate and dump circuit output with a zero voltage for determining the polarity of the compared signal for reproducing the first code in binary form.

10. A spread spectrum RF energy receiver according to claim 1 wherein the frequency and/or drift compensating means comprises a loop circuit connected to the second mixer for producing a phase difference signal, said loop circuit includes first and second mixers having first input terminals connected, respectively, to the second mixer outputs and second inputs connected, respectively, to a frequency generator in phase and quadrature signals, low-pass filters having input terminals connected, respectively, to the first and second loop mixers and output terminals, and a phase detector having input terminals connected to the low-pass filters output terminals for producing any phase difference signal and an output terminal, a filter connected to the phase detector output terminal for low-pass filtering any phase difference signal output of the phase detector, and the frequency generating means coupled to the filter whereby the phase difference signal corrects the frequency outputs of the frequency generating means for frequency drift.

11. A spread spectrum RF energy receiver according to claim 10 further including a clocked integrate and dump circuit connected to the junction of one of said low-pass filters and the phase detector for adding the first code signals at the first code data rate and a comparator for comparing the clocked integrate and dump circuit output with a zero voltage for determining the polarity of the compared signal for producing the first data code in binary form.

* * * * *